United States Patent [19]
Wike, Jr. et al.

[11] Patent Number: 5,256,865
[45] Date of Patent: Oct. 26, 1993

[54] AUTOMATIC SENSING AND PROGRAMMING CIRCUIT AND PROGRAMMING METHOD FOR OPTICAL SCANNERS

[75] Inventors: Charles K. Wike, Jr., Sugar Hill; Stephen J. Ames; William M. Belknap, both of Lawrenceville; Rex A. Aleshire, Buford; Deborah A. Detwiler, Lawrenceville, all of Ga.

[73] Assignee: NCR Corporation, Dayton, Ohio

[21] Appl. No.: 788,053

[22] Filed: Nov. 5, 1991

[51] Int. Cl.⁵ .............................................. G06K 7/10
[52] U.S. Cl. ....................................... 235/462; 235/467
[58] Field of Search .......................... 235/462, 467, 472

[56] References Cited
U.S. PATENT DOCUMENTS

| | | | |
|---|---|---|---|
| 4,086,476 | 4/1978 | King | 235/462 |
| 4,521,772 | 6/1985 | Lyon | 235/472 |
| 4,535,204 | 8/1985 | Hughes et al. | 235/472 |
| 4,550,247 | 10/1985 | Winter et al. | 235/472 |
| 4,789,775 | 12/1988 | McClain et al. | 235/470 |
| 5,151,581 | 9/1992 | Krichever et al. | 235/467 |

Primary Examiner—Carolyn E. Fields
Assistant Examiner—Drew A. Dunn
Attorney, Agent, or Firm—Paul W. Martin

[57] ABSTRACT

An automatic sensing and programming circuit for optical scanners which produces a diffuse volume of light substantially encompassing the scan volume of the scanner. A method for programming one optical scanner from another uses the circuit to emit a plurality of pulse trains which in combination represent a predetermined function or set of functions, each pulse train representing predetermined hexadecimal digit, and each pulse train including a predetermined number of binary pulses. A method of programming an optical scanner employs a plurality of tags which in combination represent a predetermined function or set of functions, each tag representing a predetermined hexadecimal digit encoded as bar code labels.

18 Claims, 4 Drawing Sheets

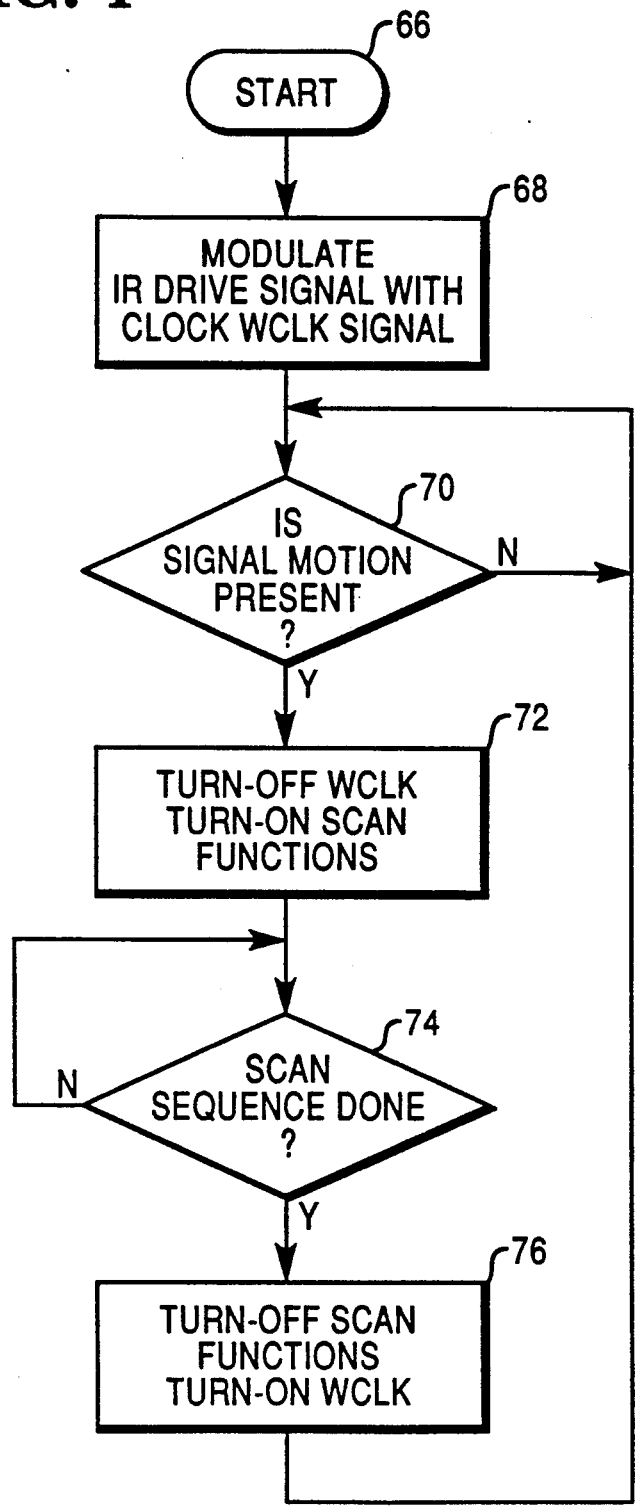

AUTOMATIC SENSING AND PROGRAMMING CIRCUIT AND PROGRAMMING METHOD FOR OPTICAL SCANNERS

CROSS REFERENCE TO RELATED APPLICATIONS

The present invention is related to the following commonly assigned and co-pending U.S. applications:

"Compact Bar Code Scanner", invented by Collins, Ser. No. 08/084,779 filed Jun. 28, 1993, which is a continuation of Ser. No. 07/759,316 filed Sep. 13, 1991, now abandoned.

"Raster Variation Method for Omnidirectional Optical Scanners", invented by Collins et al., Ser. No. 07/759,317 filed Sep. 13, 1991, now U.S. Pat. No. 5,221,832 issued Jun. 22, 1993; and "Programming Apparatus and Method for Optical Scanners", invented by Wike et al., Ser. No. 07/762,702 filed Sep. 19, 1991, now U.S. Pat. No. 5,185,514 issued Feb. 9, 1993.

BACKGROUND OF THE INVENTION

The present invention relates to optical scanning devices and more specifically to an automatic sensing and programming circuit and a programming method for optical scanners.

Optical scanners are well known for their usefulness in retail checkout and inventory control. They may be mounted within checkout counters, free-standing, or hand-held.

Optical scanners may also be programmable. Tags containing program information encoded into bar code labels may be used to program a scanner. Known programming methods employ one function per tag. While this method works well, the total number of tags becomes unmanageable as more functions are added.

One scanner may be used to program another. The receiving scanner detects the laser beam emitted from the emitting scanner. While this method works well, diffuser plates must be employed between the emitter and the receiver. Furthermore, the scanners must be configured in a non-scanning mode, a mode which is not certifiable as complying with safety regulations.

Optical scanners employ a variety of energizing devices. Some use triggers or other types of switches, while others use presence sensors, such as ambient light sensors and motion sensors. Energizing devices are often used in combination with a timing circuit for de-energizing the scanner after a predetermined time period.

While these energizing devices work well, they may require preparatory movements by the operator, separate from scanning movements, to energize the scanner. When presence sensors are employed, they may be mounted on the exterior of the scanner, or the volume covered by such sensors may not be coextensive with the scanning volume. Finally, the presence sensors have not been used to program, or receive programming instructions from, other scanners.

Therefore, it would be desirable to add a presence sensing circuit to an optical scanner which employs internal sensors, which can also be used to program other scanners, and whose sensing volume is coextensive with the scanning volume.

SUMMARY OF THE INVENTION

In accordance with the teachings of the present invention, an automatic sensing and programming circuit for optical scanners is provided. The optical scanner employs a scanning assembly, a tilted mirror assembly, an infrared sensing circuit transceiver, and a printed circuit board (PCB). The scanning assembly includes a scan module for generating a multiple scan line pattern and for receiving light reflected from a bar code label.

The scan module includes a motor for rotating a hollow drive shaft and an optical transceiver mounted on the drive shaft, which projects a laser light beam outwardly towards a ring of stationary pattern mirrors to form a multi-line scan pattern. The transceiver collects the reflected light from the coded indicia of a bar code label and directs the light at a photodetector.

The tilted mirror assembly includes a mirror and a motor. Preferably, the motor of the scan module and the motor of the tilted mirror assembly rotate in opposite directions. The mirror is off-set mounted on the drive shaft of the motor. The multi-line scan pattern generated by the stationary mirrors is projected onto the tilted mirror. The rotation and tilt of the mirror produce a raster effect which generates a dense multi-line scan pattern. The dense multi-line scan pattern is projected toward a bar code label. The density of the scan lines is controlled by speed control circuitry mounted on the PCB.

The PCB contains circuitry for processing and controlling the omnidirectional scanner, including a controller and circuitry for controlling the speed of the tilted mirror assembly motor.

The infrared sensing circuit transceiver in combination with the controller make up the automatic sensing and programming circuit of the present invention. The infrared transceiver includes an infrared light-emitting diode (LED) and a drive circuit for producing a diffuse volume of light, and a detector diode and receiver circuit for receiving the light after it has reflected from an item having a bar code label to be scanned. The controller modulates the emitted signal and activates the scan module and tilted mirror assembly motor upon receiving an output signal from the receiver circuit.

It is a feature of the present invention that the volume of space occupied by the diffuse light from the infrared LED substantially encompasses a second volume of space occupied by the scan pattern emitted by the optical scanner. Thus, the scan module is activated about the same time that an item enters the scan volume.

The automatic sensing and programming circuit of the present invention allows one scanner to program another scanner without using the laser diode of the scan module. Tags containing bar code labels for configuring the scanners as emitter and receiver are scanned by the respective scanners. These tags deenergize the scan modules of both scanners. Before programming, the scanners are oriented to face each other. The emitting scanner emits a plurality of pulse trains to be stored by the receiving scanner, each pulse train representing a hexadecimal digit, and each pulse train including a predetermined number of binary pulses. In combination, the pulse trains represent a predetermined function or set of functions. The controller implements an algorithm for decoding the pulse trains.

The programming method of the present invention also envisions using the hexadecimal digits to program scanners with tags. Instead of representing a single function with a unique tag, the method of the present invention envisions a set of tags, each tag representing a hexadecimal digit. The tags are scanned in predetermined sequences to implement predetermined functions. The controller implements an algorithm for decoding the sequences.

It is accordingly an object of the present invention to provide an automatic sensing and programming circuit for optical scanners.

It is another object of the present invention to provide an automatic sensing and programming circuit which employs an infrared LED for producing a diffuse volume of light which substantially encompasses the scan volume of the scanner.

It is another object of the present invention to provide a method for programming one scanner from another using the automatic sensing and programming circuit of the present invention.

It is another object of the present invention to provide a method for programming one scanner from another using the automatic sensing and programming circuit of the present invention which employs a plurality of pulse trains representing in combination a predetermined function or set of functions, each pulse train representing a hexadecimal digit, and each pulse train including a predetermined number of binary pulses.

It is another object of the present invention to provide a method for programming an optical scanner using a plurality of program tags which in combination represent a predetermined function or set of functions, each tag representing a hexadecimal digit.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram of the sensing method of the present invention.

DETAILED DESCRIPTION OF THE PREFERRED EMBODIMENT

Figure 1:
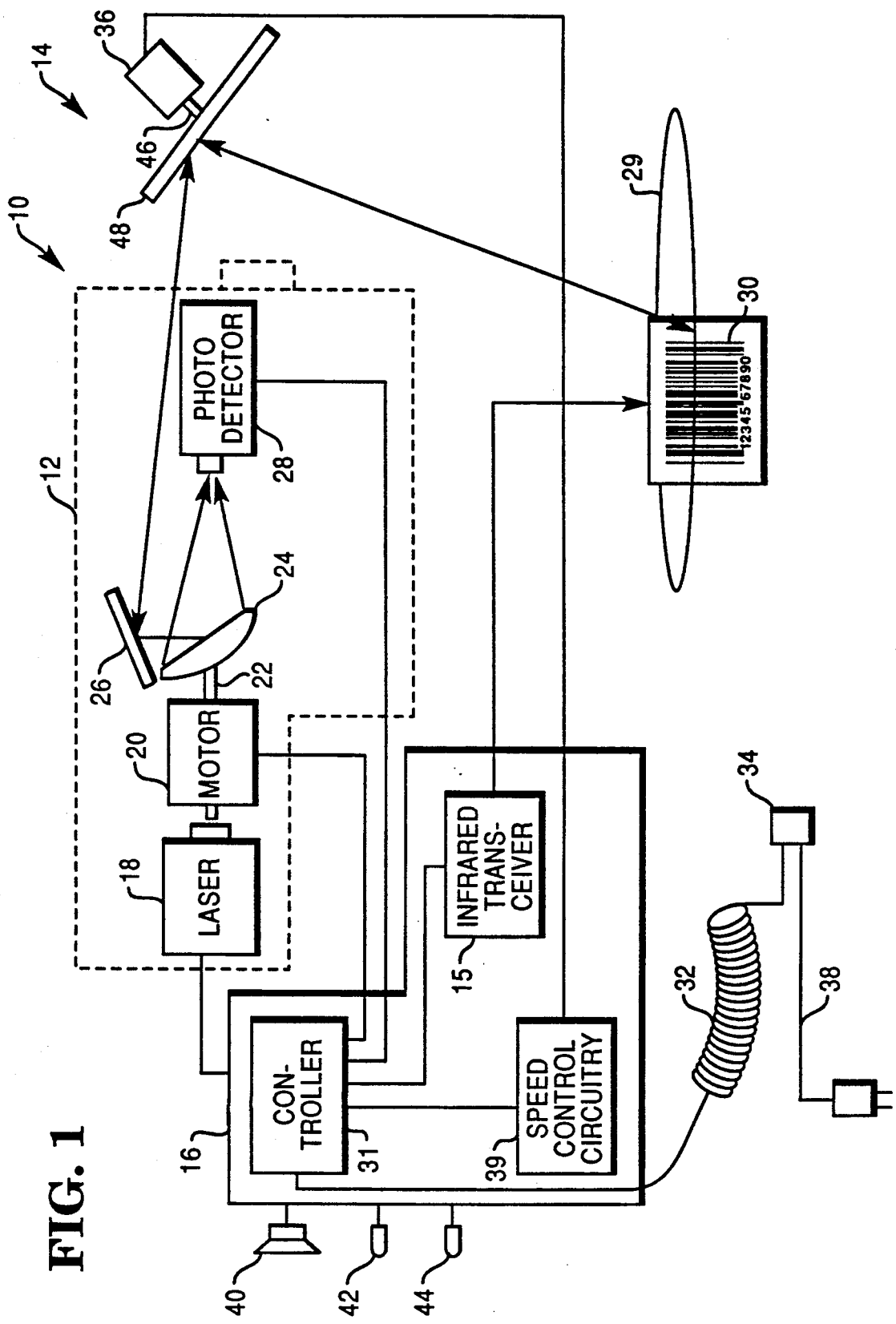
FIG. 1 is a detailed schematic representation of an optical scanner used in implementing the method of the present invention.

Referring now to FIG. 1, an optical scanner 10 containing the automatic sensing and programming circuit of the present invention is shown. Optical scanner 10 generates a substantially omnidirectional pattern and includes scan module 12, tilted mirror assembly 14, infrared transceiver 15, and printed circuit board (PCB) 16. Scan module 12 produces a first scan pattern and includes laser 18, motor 20 for driving a hollow shaft 22, optical transceiver 24 mounted to the end of shaft 22, pattern generating mirrors 26, and photodetector 28. Laser 18 projects a laser beam through hollow drive shaft 22 to be deflected by transceiver 24 towards pattern generating mirrors 26. Mirrors 26 deflect the first pattern towards tilted mirror assembly 14 to produce a second scan pattern 29, which is substantially omnidirectional. Light reflected from bar code label 30 is redirected towards pattern generating mirrors 26. Pattern generating mirrors 26 direct the light at transceiver 24 which directs the light to photodetector 28.

PCB 16 contains processing circuitry, including a controller 31, for decoding signals generated by photodetector 28 and transmitting the decoded signals over coiled cable 32 to remote processing member 34. Power is supplied to laser 18, motor 20, tilted mirror assembly motor 36, and photodetector 28 through electrical plug 38 and cable 32. Motor 36 is coupled to speed control circuitry 39. Printed circuit board 16 additionally contains circuitry for operating speaker 40, and green and red indicator lights 42 and 44, which represent valid and invalid reading operations, respectively.

Infrared transceiver 15 works in conjunction with controller 31 to sense the presence of a item having bar code label 30 in front of scanner 10 and can be additionally used to scan programming instructions from programming labels and to transmit or receive programming instructions from another scanner.

Tilted mirror assembly 14 includes motor 36 having drive shaft 46 and rotating reflecting mirror 48, which is offset-mounted to drive shaft 46. Preferably, motor 36 and motor 20 rotate in opposite directions. Motor shaft 46 is oriented at an angle to drive shaft 22, which preferably is forty-five degrees. In the preferred embodiment, bar code label 30 may also be a programming tag for programming the speed of motor 36. A feature of scanner 10 is that the speed ratio of motor 20 to motor 36 is selectable.

Figure 2:
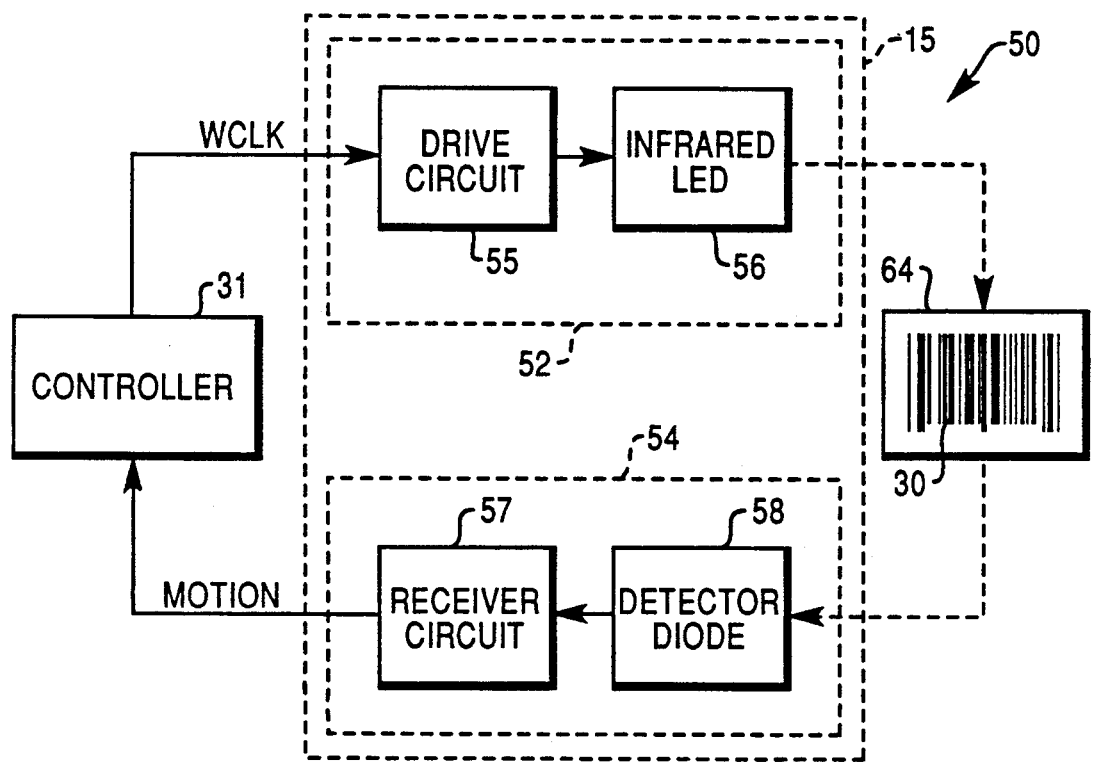
FIG. 2 is a block diagram of the automatic sensing and programming circuit of the present invention.

Referring now to FIG. 2, automatic sensing and programming circuit 50 includes controller 31 and infrared transceiver 15. Transceiver 15 includes infrared transmitter 52 and infrared receiver 54.

Preferably, transmitter 52 includes a transistor drive circuit 55 and light-emitting diode (LED) 56. Drive circuit 55 produces a drive signal for driving LED 56. The drive signal is modulated by clock signal WCLK from controller 31.

Receiver 54 includes receiver circuit 57 and detector diode 58. Receiver circuit 57 is tuned to the modulation frequency of the signal emitted from transmitter 52 to prevent ambient light or other infrared light sources from activating scan module 12 and motor 36. Only signals within a predetermined range of the modulation frequency and having a predetermined minimum magnitude activate scan module 12 and motor 36.

Figure 3:
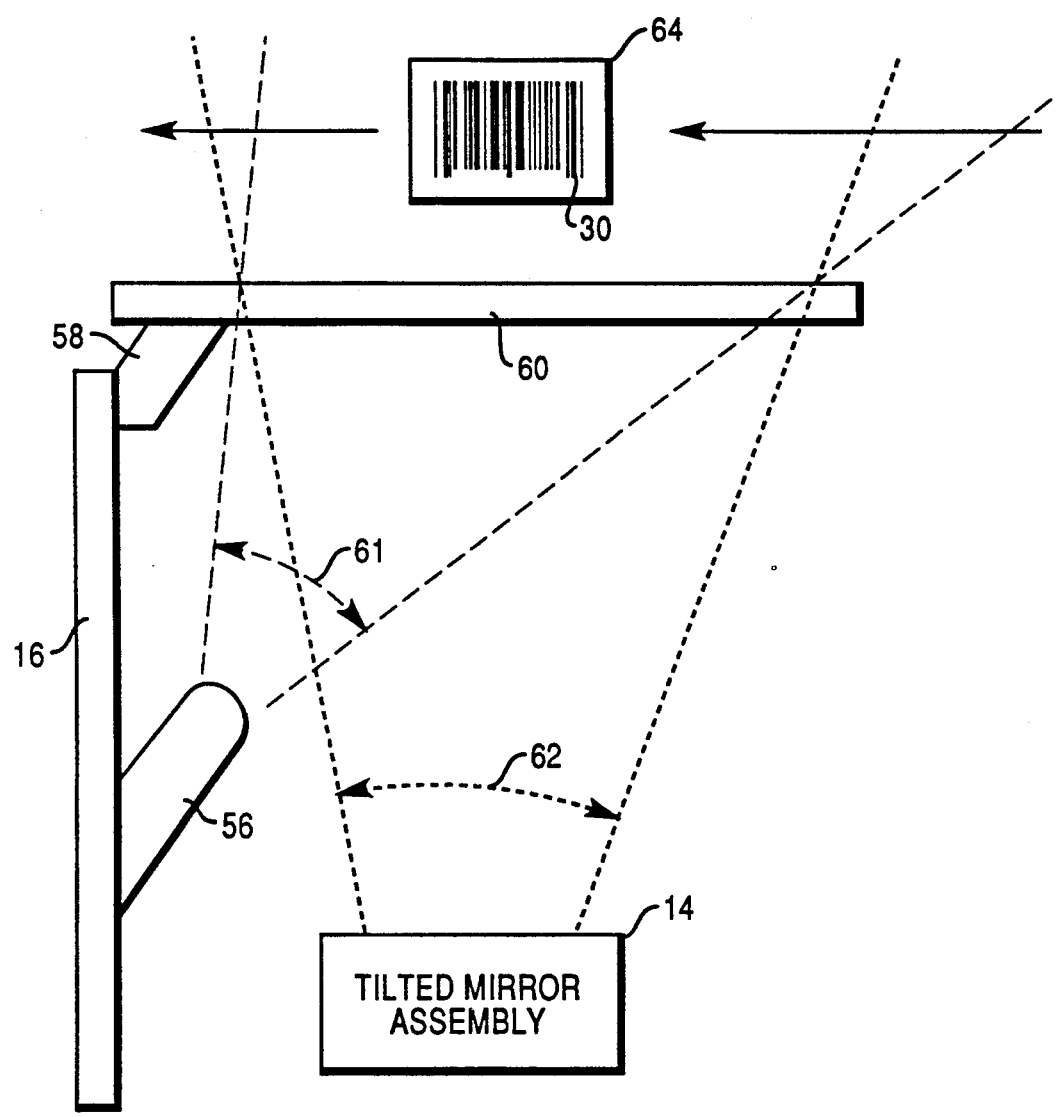
FIG. 3 is a side view of the volumes illuminated by the scanner and the automatic sensing and programming circuit.

Turning now to FIG. 3, both LED 56 and detector diode 58 are mounted on one side of PCB 16 inside optical scanner 10. LED 56 produces illumination volume 61 and is mounted in a position to illuminate substantially all of scanner window 60 and to encompass substantially all of scan volume 62. Thus, the scan module is activated about the same time that an item enters the scan volume. Detector diode 58 is mounted in a position to receive substantially all of the reflected light from item 64.

Referring now to FIG. 4, the role of controller 31 in sensing movement of item 64 is explained in more detail beginning with START block 66. In block 68, controller 31 modulates the drive signal produced by transmitter 52 with clock signal WCLK.

In block 70, controller 31 awaits signal MOTION from receiver 54. If controller 31 senses signal MOTION due to the presence of item 64 within illumination volume 61, controller 31 turns off clock signal WCLK and activates scan module 12 and motor 36 in block 72.

In block 74, controller 31 awaits the completion of a scanning sequence represented by the movement of item 64 through scan volume 62 and the end of a predetermined time period. If the scanning sequence is finished, controller 31 turns off scan module 12 and motor 36 and turns on clock signal WCLK in block 76 and returns to block 70 to await another scan sequence.

Automatic sensing and programming circuit 50 may also be used to transfer programmed parameters from one optical scanner to another. Program tags are used to convert a first optical scanner into an emitting scanner and a second optical scanner into a receiving scanner. The program tags disable laser 18 and scanner motors 20 and 36 in both scanners. The scanners are then oriented so that the emitting scanner faces the receiving scanner. Microcontroller 31 turns the transmitter 52 of the emitting scanner on and off to transfer data.

Under the programming method of the present invention, code words are constructed of digits corresponding to particular functions. Preferably, sixteen digits representing each hexadecimal digit ("0" through "F") are employed to construct the code words. These code words are stored in the memory of controller 31, which also contains algorithms which recognize and decipher the code words.

Each digit of each code word consists of a predetermined sequence of data pulses. Preferably, each sequence is eight bits long and a "0" bit is represented by a pulse twice as wide as a pulse representing a "1" bit. To minimize the detection of false bits, the present invention employs a window of minimum and maximum pulse heights between which received signals must fall.

The reliability and robustness of the data transfer can be improved. For example, START and END pulses having unique pulse widths may be used. CHECK CHARACTER pulses may also be used. Finally, an ACKNOWLEDGEMENT pulse may be transmitted by the receiving scanner to signal good transmission, or bad transmission with an instruction to the emitting scanner to retransmit.

Use of automatic sensing and programming circuit 50 instead of scan module 12 to transfer programming offers several advantages. Since the light from LED 56 is already diffuse, no diffusers are required. Detector diode 58 is in a position to directly receive light from LED 56 without the aid of sensitive optics. Finally, LED 56 is more tolerant to drive voltage variation than laser 18 and is more easily and reliably modulated.

The hexadecimal digits of the present invention may also be encoded as bar code labels and printed on tags to program scanners. Instead of using one tag for each function, the method of the present invention uses a predetermined number of tags as an alphabet for constructing code words corresponding to particular functions or sets of functions. These code words are stored in the memory of controller 31, which contains algorithms which recognize the code words. Preferably, sixteen tags representing each hexadecimal digit ("0" through "F") are employed.

Advantageously, the method of the present invention provides significant flexibility as the number of tags is limited. New options may be easily added since additional tags are not required.

In addition to the sixteen hexadecimal tags, five special tags are used, including PROGRAMMING MODE, DEFAULT, END, ABORT, and SAVE and RESET tags:

the PROGRAMMING MODE tag forces optical scanner 10 into a program mode;

the DEFAULT tag forces scanner 10 to perform a power up sequence so that defaults can take effect;

the END tag is used to end an input sequence when the final input value may not be obvious;

the ABORT tag is used to abort a programming input sequence or to abort the entire PROGRAMMING MODE and to revert to previous parameters; and the SAVE and RESET tag saves all of the new programmed options and forces a power up sequence to allow the new parameters to take effect.

Additional tags, such as MACRO tags, may also be used. A MACRO tag is one which combines a number of option selections into one tag to save programming time.

For example, changing the frequency and duration of the good read tone, which is audible upon scanner 10 reading a bar code label, requires that the first character of the corresponding program word consist of an identifier for good tone parameters, which is "10". The next character consists of an enable, which is "0". The next character identifies the desired frequency from a menu of frequency options, each menu item having a corresponding hexadecimal digit. Suppose that frequency menu item "1" is chosen. The last digit identifies the tone duration from a menu of duration options. Suppose the desired duration is identified by the character "2". The word resulting from the combination of these digits is "10012".

To implement the desired change in good read tone characteristics, tags containing bar code labels corresponding to each digit are scanned individually and in order. An algorithm within controller 31 decodes the word and implements the instructions.

Other functions, such as scanner timeout period, bad read tone parameters, communication parameters, bar code decoding parameters, bar code options, and interface parameters, are also programmable under the method of the present invention.

Although the invention has been described with particular reference to certain preferred embodiments thereof, variations and modifications of the present invention can be effected within the spirit and scope of the following claims.

What is claimed is:

1. A sensing circuit for an optical scanner comprising:
   means for emitting a diffuse infrared signal occupying a first volume of space adjacent the scanner;
   means coupled to the emitting means for generating a modulation signal for modulating the infrared signal;
   means for receiving the modulated infrared signal after it has reflected from an item within the first volume and for generating an output signal; and
   means for energizing the optical scanner in response to the output signal from the receiving means;
   wherein the first volume of space substantially encompasses a second volume of space occupied by the scan pattern emitted by the optical scanner.

2. The sensing circuit as recited in claim 1, wherein the emitting means comprises:
   an infrared LED; and
   a drive circuit coupled to the LED.

3. The sensing circuit as recited in claim 1, wherein the receiving means comprises:
   an infrared detector diode; and a receiver circuit coupled to the infrared detector diode.

4. The sensing circuit as recited in claim 1, wherein the generating means comprises a controller and the modulation signal is a clock signal.

5. The sensing circuit as recited in claim 1, wherein the energizing means comprises a controller.

6. A sensing circuit for an optical scanner comprising:
   means for emitting a diffuse infrared signal occupying a first volume of space adjacent the scanner including an infrared LED, and a drive circuit coupled to the LED;
   means for receiving the infrared signal after it has reflected from an item within the first volume and for generating an output signal, including an infrared detector diode and a receiver circuit coupled to the infrared detector diode; and
   a controller, coupled to the emitting means, the receiving means, and the optical scanner, for generating a clock signal for modulating the infrared signal and for energizing the optical scanner in response to the output signal from the receiving means;
   wherein the first volume of space substantially encompasses a second volume of space occupied by the scan pattern emitted by the optical scanner.

7. An apparatus for programming a second optical scanner with information from a first optical scanner comprising:
   means within the first optical scanner for emitting a diffuse infrared signal;
   means coupled to the emitting means for generating a modulating signal containing the information for modulating the infrared signal;
   means within the second scanner for receiving the modulated infrared signal and for generating an output signal containing the information; and
   means within the second scanner for storing the information in the output signal.

8. The apparatus as recited in claim 7, wherein the emitting means comprises:
   an infrared LED; and
   a drive circuit coupled to the LED.

9. The apparatus as recited in claim 7, wherein the generating means comprises a first controller.

10. The apparatus as recited in claim 7, wherein the receiving means comprises:
    an infrared detector diode; and
    a receiver circuit coupled to the infrared detector diode.

11. The apparatus as recited in claim 9, wherein the storing means comprises:
    a second controller.

12. An apparatus for programming a second optical scanner with information from a first optical scanner comprising:
    means within the first optical scanner for emitting a diffuse infrared signal, including an infrared LED and a drive circuit coupled to the LED;
    means coupled to the emitting means for generating a modulating signal containing the information for modulating the infrared signal including a first controller;
    means within the second scanner for receiving the modulated infrared signal and for generating an output signal containing the information, including an infrared detector diode and a receiver circuit coupled to the infrared detector diode; and
    means within the second scanner responsive to the output signal for storing the information, including a second controller.

13. A method for programming a second optical scanner with information from a first optical scanner comprising the steps of:
    (a) deenergizing the lasers and motors of the first and second scanners.
    (b) emitting a diffuse infrared signal from the first scanner;
    (c) generating a modulating signal containing the information at the first scanner;
    (d) modulating the infrared signal at the first scanner;
    (e) receiving the modulated infrared signal at the second scanner;
    (f) generating a signal containing the information at the second scanner; and
    (g) storing the information in the second scanner.

14. The method as recited in claim 13, further comprising the step of:
    (h) placing the emitting side of the first scanner opposite the receiving side of the second scanner.

15. The method as recited in claim 14, wherein step (c) comprises the substep of:
    (c-1) generating a plurality of pulse trains, wherein each pulse train represents a predetermined hexadecimal digit and includes a predetermined number of binary pulses, wherein each pulse has a predetermined height within a predetermined range of heights.

16. The method as recited in claim 14, wherein step (a) comprises the substep of:
    (a-1) scanning a bar code label containing program instructions for deactivating the lasers and motors in the first and second scanners.

17. A method for programming an optical scanner comprising the steps of:
    (a) scanning a plurality of bar code labels, wherein each bar code label represents a predetermined hexadecimal digit, wherein the combination of bar code labels arranged in sequence represents a predetermined scanner function;
    (b) decoding the sequence of hexadecimal digits; and
    (c) implementing the predetermined scanner function.

18. A method for programming an optical scanner comprising the steps of:
    (a) scanning a plurality of bar code labels, wherein each bar code label represents a predetermined hexadecimal digit, wherein the combination of bar code labels arranged in sequence represents a first predetermined scanner function;
    (b) decoding the sequence of hexadecimal digits;
    (c) implementing the first predetermined scanner function; and
    (d) scanning a single bar code label representing a second predetermined scanner function.

* * * * *